(12) United States Patent
Lee et al.

(10) Patent No.: US 10,786,786 B2
(45) Date of Patent: Sep. 29, 2020

(54) METHOD FOR MANUFACTURING MEMBRANE USING SELECTIVE LAYER PREPARED THROUGH SUPPORT-FREE INTERFACIAL POLYMERIZATION

(71) Applicant: Korea University Research and Business Foundation, Seoul (KR)

(72) Inventors: Jung-hyun Lee, Seoul (KR); Jong Suk Lee, Seoul (KR); Wan Suk Choi, Gyeonggi-do (KR)

(73) Assignee: Korea University Research and Business Foundation, Seoul (KR)

( * ) Notice: Subject to any disclaimer, the term of this patent is extended or adjusted under 35 U.S.C. 154(b) by 368 days.

(21) Appl. No.: 15/570,450

(22) PCT Filed: Apr. 21, 2016

(86) PCT No.: PCT/KR2016/004134
§ 371 (c)(1),
(2) Date: Oct. 30, 2017

(87) PCT Pub. No.: WO2016/175499
PCT Pub. Date: Nov. 3, 2016

(65) Prior Publication Data
US 2018/0141831 A1    May 24, 2018

(30) Foreign Application Priority Data

Apr. 29, 2015    (KR) .................. 10-2015-0060653

(51) Int. Cl.
*B01D 69/12*    (2006.01)
*B01D 69/10*    (2006.01)
(Continued)

(52) U.S. Cl.
CPC ....... *B01D 69/125* (2013.01); *B01D 67/0006* (2013.01); *B01D 67/0037* (2013.01);
(Continued)

(58) Field of Classification Search
CPC .......... C02F 1/441; C02F 1/442; C02F 1/445; C02F 2103/08; B01D 69/10; B01D 69/12;
(Continued)

(56) References Cited

U.S. PATENT DOCUMENTS

| 4,277,344 A | 7/1981 | Cadotte |
| 5,614,099 A | 3/1997 | Hirose et al. |
| 2012/0318729 A1* | 12/2012 | Yip ..................... B01D 61/002 210/490 |

FOREIGN PATENT DOCUMENTS

| KR | 10-1998-0068279 A | 10/1998 |
| KR | 10-2011-0056672 A | 5/2011 |

(Continued)

OTHER PUBLICATIONS

English translation Korean Patent Application No. 10-2014-0114109 A (2014).*
(Continued)

*Primary Examiner* — John Kim
(74) *Attorney, Agent, or Firm* — Fox Rothschild LLP (57) ABSTRACT

The present invention relates to a method for manufacturing a composite membrane using a selective layer prepared through the interfacial polymerization (support-free interfacial polymerization) on a free interface without a support and, more specifically, to a method for manufacturing a composite membrane comprising a reverse osmotic membrane, which is obtained by preparing a selective layer through a spontaneous reaction of two organic monomers on an interface between two immiscible solutions and allowing the selective layer to adhere to a support. By employing the method for manufacturing a composite membrane having a selective layer prepared through the support-free interfacial polymerization according to the present invention, a high-functional reverse osmotic membrane can be prepared using various supports other than a conventional polysulfone
(Continued)

support, thereby extending the application range of the reverse osmotic membrane, which has been restricted due to low chemical resistance of polysulfone. In addition, the preparation method for the selective layer can be controlled more precisely than a conventional method, and the analysis of components (selective layer, support, and interface) of the composite membrane is easy.

10 Claims, 4 Drawing Sheets

(51) Int. Cl.

| | | |
|---|---|---|
| *B01D 67/00* | (2006.01) | |
| *B01D 71/56* | (2006.01) | |
| *B01D 61/02* | (2006.01) | |
| *C02F 1/44* | (2006.01) | |
| *C02F 103/08* | (2006.01) | |

(52) U.S. Cl.
CPC ........... *B01D 69/10* (2013.01); *B01D 69/105* (2013.01); *B01D 69/12* (2013.01); *B01D 71/56* (2013.01); *C02F 1/441* (2013.01); *B01D 61/025* (2013.01); *C02F 1/442* (2013.01); *C02F 1/445* (2013.01); *C02F 2103/08* (2013.01)

(58) Field of Classification Search
CPC .... B01D 69/125; B01D 69/105; B01D 71/56; B01D 67/0037; B01D 67/0006; B01D 61/025
See application file for complete search history.

(56) References Cited

FOREIGN PATENT DOCUMENTS

| KR | 10-2013-0098031 A | 9/2013 |
|---|---|---|
| KR | 10-2014-0114109 A | 9/2014 |

OTHER PUBLICATIONS

Park, Jong Won et al., "Interfacial Ploymerization Formation and Thickness of Thin Film", Academic thesis, The Membrane Society of Korea Autumn Meeting, pp. 87-89, Oct. 31, 1997.

Lee, Kah Peng, et al., "A Review of Reverse Osmosis Membrane Materials for Desalination—Development to date and Future Potential", Journal of Membrane Science (2011).

* cited by examiner

METHOD FOR MANUFACTURING MEMBRANE USING SELECTIVE LAYER PREPARED THROUGH SUPPORT-FREE INTERFACIAL POLYMERIZATION

TECHNICAL FIELD

The present invention relates to a method for manufacturing a membrane using a selective layer prepared through interfacial polymerization at a free interface which does not have a support (support-free interfacial polymerization), and more particularly, to a method for manufacturing a thin-film composite-type membrane (thin film composite membrane) including a reverse osmotic membrane, which is obtained by preparing a polymer selective layer through a spontaneous reaction of organic monomers at an interface between immiscible solutions and adhering the selective layer to a support.

BACKGROUND ART

Theoretical proposals for a reverse osmotic membrane and research thereon began in the 1950s, and a reverse osmotic membrane using a cellulose-based polymer was developed by Loeb and Sourirajan at UCLA in 1958. The reverse osmotic membrane has advantages of low costs and a simple manufacturing process, but has problems of low removal performance and poor chemical durability. In order to solve these problems, a polyamide-based reverse osmotic membrane was developed by Cadotte to solve the performance and durability problems of the cellulose-based membrane, and a thin-film composite-type polyamide membrane has currently been commercialized and produced by DuPont, U.S. That is, a reverse osmotic membrane currently used in a spiral wound module is in the form of a composite in which a thin aromatic polyamide selective layer is on a polysulfone ultrafiltration membrane support based on a polyethylene nonwoven fabric, and has excellent permeation performance as a membrane (K. P. Lee et al., *Journal of Membrane Science*, 370:1-22, 2011).

In such a current technology, a polyamide-based reverse osmotic membrane is manufactured by impregnating a porous support with an organic monomer solution, then bringing them in contact with other immiscible organic monomer solutions and thus inducing an interfacial polymerization reaction between two organic monomers to prepare a polyamide selective layer. Such a manufacturing method has a problem in which the structure (thickness, density, degree of crosslinking and the like) of a polyamide selective layer absolutely depends on the characteristics (physicochemical structure) of a support. For this reason, when a membrane is manufactured using a support rather than a support having a specific chemical structure (polysulfone) and a specific physical structure (small pore structure), a polyamide selective layer is not properly formed, and thus there is a limitation in expanding the product specifications and application field of a reverse osmotic membrane. Therefore, research on the manufacture of a reverse osmotic membrane using a different type of a support from a currently used support through improvement of a method and the like is continuing, but there is no achievement of commercialization at present.

Interfacial polymerization is a method for polymerizing a polymer through a spontaneous reaction of two organic monomers at an interface, and is a method in which organic monomers each are dissolved in two immiscible solutions and thus two solutions are brought in contact to polymerize a polymer at an interface between the solutions. This method is used to prepare various polymers such as polyaniline, nylon and the like, and is currently the most widely used polymerization technology in the membrane field. A general commercialized reverse osmotic membrane is in the form of a composite composed of a combination of a selective layer formed through the interfacial polymerization of an amine monomer in an aqueous solution and an acyl chloride monomer in an organic solvent on a polysulfone support.

An interfacially polymerized membrane manufactured by the above method was first developed by DuPont, has superior separation performance compared to previous membranes, and thus has dominated many reverse osmotic membrane markets since commercialization. However, a current commercialized reverse osmotic membrane also has a disadvantage of limited application fields because of severe membrane contamination caused by an uneven surface and poor chemical durability of polysulfone as a support.

Currently, a polysulfone ultrafiltration membrane that is mainly used as a support of a reverse osmotic membrane exhibits high hydrophobicity and has a small pore size. When a membrane is manufactured through conventional interfacial polymerization using a support having a physicochemically different structure, a selective layer is not smoothly formed, and thus it is difficult to manufacture a membrane having excellent performance. Therefore, it is not possible to replace the type of support.

Accordingly, the present inventors have attempted to develop a method for manufacturing a composite-type reverse osmotic membrane that is not affected by the characteristics of a support. As a result, the present inventors verified that it is possible to manufacture a reverse osmotic membrane that is not affected by the characteristics of a support by adhering, onto a support, a selective layer prepared through interfacial polymerization at a free interface which does not have a support (support-free interfacial polymerization), and completed the present invention.

DISCLOSURE

Technical Problem

An object of the present invention is to provide a method for manufacturing a membrane using a selective layer prepared through interfacial polymerization at a free interface which does not have a support (support-free interfacial polymerization).

Another object of the present invention is to provide methods for seawater desalination, water treatment, concentrating a useful substance and removing an impurity using an interfacially polymerized membrane.

Technical Solution

In order to accomplish the above objectives, the present invention provides a method for manufacturing a composite membrane, which includes bringing a first solution in which a first organic monomer is dissolved in a first solvent in contact with a second solution in which a second organic monomer is dissolved in a second solvent to form an interface between the two solutions; inducing polymerization of the first organic monomer and the second organic monomer at the formed interface to form a selective layer; and adhering the selective layer to a support.

The present invention also provides a composite membrane manufactured by the above method and in which a selective layer with a thickness ranging from 1 to 1000 nm formed through interfacial polymerization at a free interface which does not have a support is adhered to a support.

The present invention also provides a method for seawater desalination and water treatment using the composite membrane.

The present invention also provides a method for concentrating a useful substance using the composite membrane.

The present invention also provides a method for removing an impurity using the composite membrane.

MODES OF THE INVENTION

Unless otherwise defined, all technical and scientific terms used herein have the same meaning as commonly understood by those of ordinary skill in the art. In general, the nomenclature used herein is well known and commonly used in the art.

The present invention is to develop a method for manufacturing a composite-type reverse osmosis membrane that is not affected by the characteristics of a support, and relates to a selective layer prepared through interfacial polymerization at a free interface which does not have a support (support-free interfacial polymerization) and a method for manufacturing a composite membrane using the same. More particularly, the present invention relates to a method for preparing a polymer selective layer through a spontaneous reaction of two organic monomers at an interface between two solutions (usually, an aqueous solution and an organic solvent) and adhering the selective layer to a support.

In one example of the present invention, the support-free interfacial polymerization according to the present invention can contribute to the manufacture of a composite-type membrane by synthesizing and adhering the same selective layer which is synthesized without being affected by the characteristics of a support compared to conventional interfacial polymerization. Unlike a conventional interfacial polymerization-based membrane, it is easy to analyze structures and properties due to a well-defined interface between a support and a selective layer. Also, when the surface and cross-sectional structures of selective layers of membranes are compared, the selective layer prepared through the support-free interfacial polymerization is thinner and less uneven than that prepared through the conventional interfacial polymerization, and thus it is predicted that water flux performance and contamination resistance are excellent. In particular, since a selective layer with a thickness of about 17 nm formed through the support-free interfacial polymerization is thinner than a selective layer with a thickness ranging from about 80 to 200 nm formed through the conventional interfacial polymerization, it is possible to manufacture a membrane having a precise form and excellent performance and thus the process improvement of a membrane can be further increased.

According to one aspect of the present invention, a composite membrane having a selective layer formed at a free interface which does not have a support is preferably manufactured as follows. First, after a porous support is fixed to a frame and put into a container, a first solution in which a first organic monomer is dissolved is put into the container such that the support is completely submerged. Next, a second solution in which a second organic monomer is dissolved is carefully put into the container containing the first solution to form an interface between the two solutions. Since the interface thus formed is away from a surface of the support, the support does not affect the synthesis of a selective layer. Here, a reaction between the organic monomers dissolved in the two solutions occurs at the interface to prepare a selective layer. Next, the valve under the container is opened to slowly lower the level of the organic monomer solutions so that the prepared selective layer settles on the surface of the support. Next, any remaining solution is removed, a residual reactant is completely removed through washing, and then a resulting material is dried to manufacture a membrane.

The porous support used in the method for manufacturing an interfacially polymerized membrane is an ultrafiltration membrane having a pore size ranging from 1 to 1000 nm, and examples thereof include polyacrylonitrile (PAN), polyvinylidene fluoride (PVDF), polysulfone (PSF), polyethersulfone (PES) and the like. As necessary, in order to improve the interfacial adhesion between the selective layer and the support, the surface of the support is chemically treated by acid/base treatment, plasma treatment, UV treatment, and an inorganic or organic material coating. Also, during the interfacial polymerization, a polar solvent such as water and the like may be used as the first solvent which dissolves the first organic monomer, and an organic solvent such as hexane, toluene and the like, which are immiscible with the first solvent, may be used as the second solvent which dissolves the second organic monomer. The first organic monomer includes a molecule having an amine, hydroxyl or cyanate end-group, and the second organic monomer includes a molecule having an acyl chloride or the like end-group that spontaneously polymerizes with the first organic monomer.

Therefore, in one aspect, the present invention relates to a method for manufacturing a composite membrane which includes bringing a first solution in which a first organic monomer is dissolved in a first solvent in contact with a second solution in which a second organic monomer is dissolved in a second solvent to form an interface between the two solutions; inducing polymerization of the first organic monomer and the second organic monomer at the formed interface to form a selective layer; and adhering the selective layer to a support.

In the present invention, the selective layer may be adhered to the support in various forms. For example, (i) an upper surface of the support and a lower surface of the selective layer have opposite charges, and thus they can be adhered to each other by electrostatic attraction between the two surfaces; (ii) they can be adhered to each other by a hydrogen bond, ionic bond or the polarity of a carboxyl group (—COOH) (alternatively, an amine group (—NH$_2$)) of the upper surface of the support and an amine group (—NH$_2$) (alternatively, a carboxyl group (—COOH)) of the lower surface of the selective layer (For example, a PAN support is surface-modified with a NaOH solution, and thus a selective layer is adhered thereto by an ionic bond or a hydrogen bond); and (iii) the surface of the support is chemically treated to increase hydrophilicity, and thus the selective layer may be physicochemically stably adhered to the support, but the present invention is not limited thereto. The surface treatment of the support may be achieved through acid/base treatment, chemical oxidation, plasma and UV treatment, atomic layer deposition (ALD), chemical vapor deposition (CVD), an inorganic or organic material coating and the like.

In the present invention, a support surface treatment method for improving an adhesive force between the selective layer and the support may be chemical oxidation using an acidic solution including hydrochloric acid, sulfuric acid, nitric acid, hydrogen peroxide or sodium hypochlorite, chemical oxidation using an basic solution including sodium hydroxide, potassium hydroxide or ammonium hydroxide, plasma oxidation, ultraviolet (UV) oxidation, atomic layer deposition (ALD), chemical vapor deposition (CVD), an inorganic material coating using copper, copper oxide, zinc oxide, titanium oxide, tin oxide, aluminum oxide or the like, and an organic material and polymer coating using polyhydroxyethylenemethacrylate, polyacrylic acid, polyhydroxymethylene, polyarylamine, polyaminostyrene, polyacrylamide, polyethyleneimine, polyvinyl alcohol, polydopamine and the like.

In the present invention, the support may be manufactured of a material selected from the group consisting of polysulfone (PSF), polyethersulfone (PES), polyacrylonitrile (PAN), polyimide, polyetherimide, polyether ether ketone (PEEK), polyethylene (PE), polypropylene (PP), polyvinylidene fluoride (PVDF), polyvinyl chloride, polytetrafluoroethylene (PTFE), polyvinylpyrrolidone (PVP), polycarbonate, cellulose acetate (CA), polybenzoimidazole (PBI) and a combination thereof. Also, the support may be porous and have a pore size ranging from 1 nm to 1000 μm.

In the present invention, the first solvent may be one or more solvents selected from the group consisting of water, methanol, ethanol, propanol, butanol, isopropanol, ethyl acetate, acetone and chloroform, and the first organic monomer may be a organic monomer selected from the group consisting of a molecule having an amine, hydroxyl or cyanate end-group, m-phenylene diamine (MPD), o-phenylene diamine (OPD), p-phenylene diamine (PPD), piperazine, m-xylene diamine (MXDA), ethylenediamine, trimethylenediamine, hexamethylenediamine, diethylene triamine (DETA), triethylene tetramine (TETA), methane diamine (MDA), isophoronediamine (IPDA), triethanolamine, polyethyleneimine, methyl diethanolamine, hydroxyalkylamine, hydroquinone, resorcinol, catechol, ethylene glycol, glycerine, polyvinyl alcohol, 4,4'-biphenol, methylene diphenyl diisocyanate, m-phenylene diisocyanate, p-phenylene diisocyanate, toluene diisocyanate and a combination thereof.

In the present invention, the second solvent may be one or more solvents selected from the group consisting of hexane, pentane, cyclohexane, heptane, octane, carbon tetrachloride, benzene, xylene, toluene, chloroform, tetrahydrofuran and isoparaffin, and the second organic monomer may be an organic monomer selected from the group consisting of a molecule having an acyl chloride end-group, trimesoyl chloride (TMC), terephthaloyl chloride, isophthaloyl chloride, cyclohexane-1,3,5-tricarbonyl chloride, 5-isocyanato-isophthaloyl chloride, cyanuric chloride, trimellitoyl chloride, phosphoryl chloride, glutaraldehyde and a combination thereof.

Figure 4:
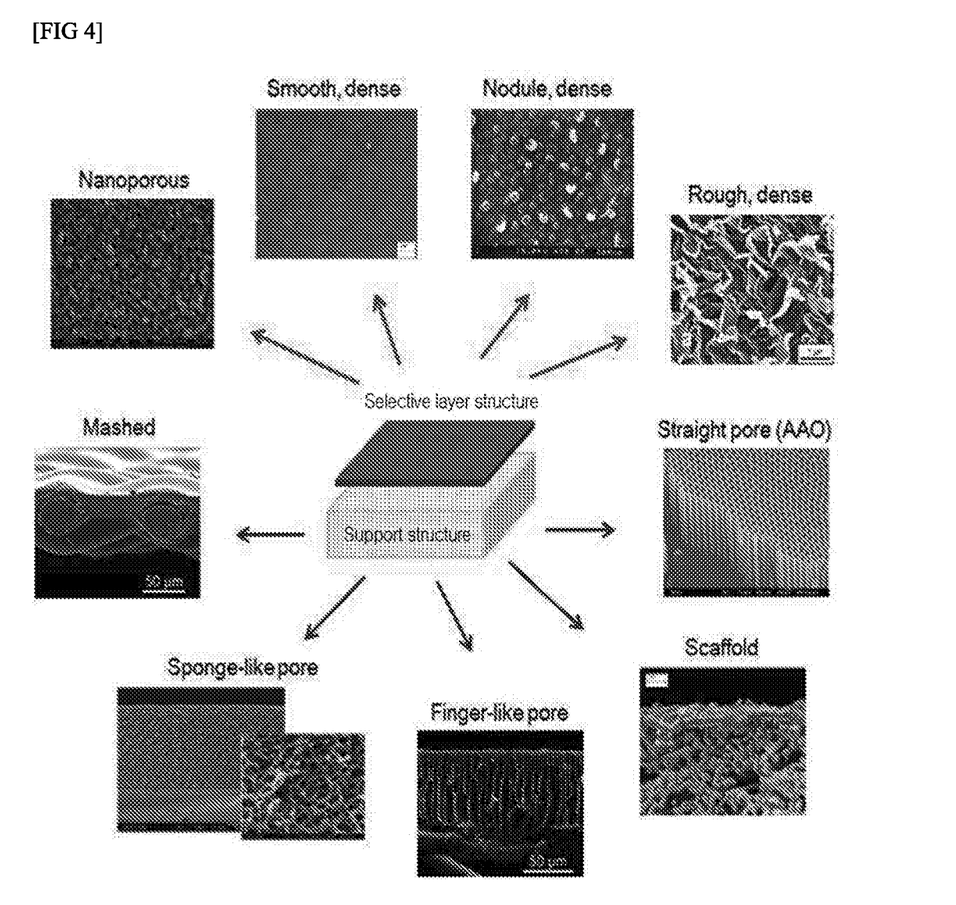
FIG. 4 illustrates various types of composite membranes which can be manufactured using a selective layer prepared through the support-free interfacial polymerization.

In another example of the present invention, it was confirmed that the performance of the membrane significantly varies depending on a manufacturing method using the conventional interfacial polymerization or support-free interfacial polymerization. That is, while a membrane manufactured through the conventional interfacial polymerization using a PAN support exhibits a salt (NaCl) rejection rate of about 96.7%, a membrane manufactured through the support-free interfacial polymerization exhibits a salt rejection rate of about 99.0%, indicating that the membrane manufactured through the support-free interfacial polymerization can be applied to a reverse osmotic membrane for seawater desalination due to its highly excellent salt rejection performance. Also, while a membrane manufactured through the conventional interfacial polymerization exhibits a water flux of about 8.7 Lm$^{-2}$h$^{-1}$, a membrane manufactured through the support-free interfacial polymerization exhibits a water flux of about 13.3 Lm$^{-2}$h$^{-1}$, indicating that the membrane manufactured through the support-free interfacial polymerization is also excellent in terms of permeate flux. That is, it can be seen that, although the same polymerization composition and support are used, the membrane manufactured through the support-free interfacial polymerization exhibits excellent salt rejection and water flux. The support-free interfacial polymerization can be applied to the manufacture of a reverse osmotic membrane in seawater desalination and water treatment fields and a membrane for nanofiltration, forward osmosis and pressure retarded osmosis (FIG. 4). For example, the membrane manufactured by the method according to the present invention can be applied to a sterilization/aseptic system, a purification system for drinking water (drainage), a desalination system for seawater, a concentration system for an effective component of foods and chemicals and the like, but the present invention is not limited thereto.

Therefore, in another aspect, the present invention relates to methods for seawater desalination, water treatment, concentrating a useful substance and removing an impurity using the interfacial polymerization-based composite membrane. The method for removing an impurity may be reverse osmosis, nanofiltration, forward osmosis or pressure retarded osmosis.

Hereinafter, the present invention will be described in more detail with reference to examples. It is clear to those skilled in the art that these examples are only exemplary and the scope of the present invention should not be interpreted as limited thereto.

Example 1: Manufacture of Composite Membrane Having Selective Layer Formed Through Interfacial Polymerization at Free Interface which does not have Support (Support-Free Interfacial Polymerization)

Material

Porous support: a polyacrylonitrile (PAN) support having a pore size of about 20 nm was hydrolyzed in a NaOH aqueous solution to modify a surface thereof.

Organic monomer and solvent for interfacial polymerization: m-phenylene diamine (MPD) was used as a first organic monomer and dissolved in water, a first solvent. Trimesoyl chloride (TMC) was used as a second organic monomer and dissolved in hexane (n-hexane), a second solvent.

Manufacturing Method

A selected porous PAN support was fixed in a container equipped with a valve.

A first solution (MPD aqueous solution) was poured onto the PAN support fixed in the container such that the support was completely submerged.

A second solution (TMC organic solution) prepared of an organic solvent which is immiscible with the first solution was poured into the container to form an interface, and polymerization between the two organic monomers (MPD and TMC) was induced to prepare a selective layer.

The valve was opened to remove the solutions used in the reaction and simultaneously to slowly lower the level of the interface, and thus the polymerized selective layer settles on an upper surface of the support so that the selective layer was not damaged.

After the adhesion of the selective layer was confirmed, residual monomers were removed through washing with hexane, thereby the polymerization was completed.

A manufactured membrane was dried in an oven at 50° C. for 30 minutes to complete the manufacture of a membrane.

Observation of Uneven Surface and Thickness Characteristics of Selective Layer of Composite Membrane The morphology of the selective layer of the membrane thus manufactured was observed with the S-4800 field emission scanning electron microscope (commercially available from Hitachi High-Technologies Corporation, Japan).

Figure 1:
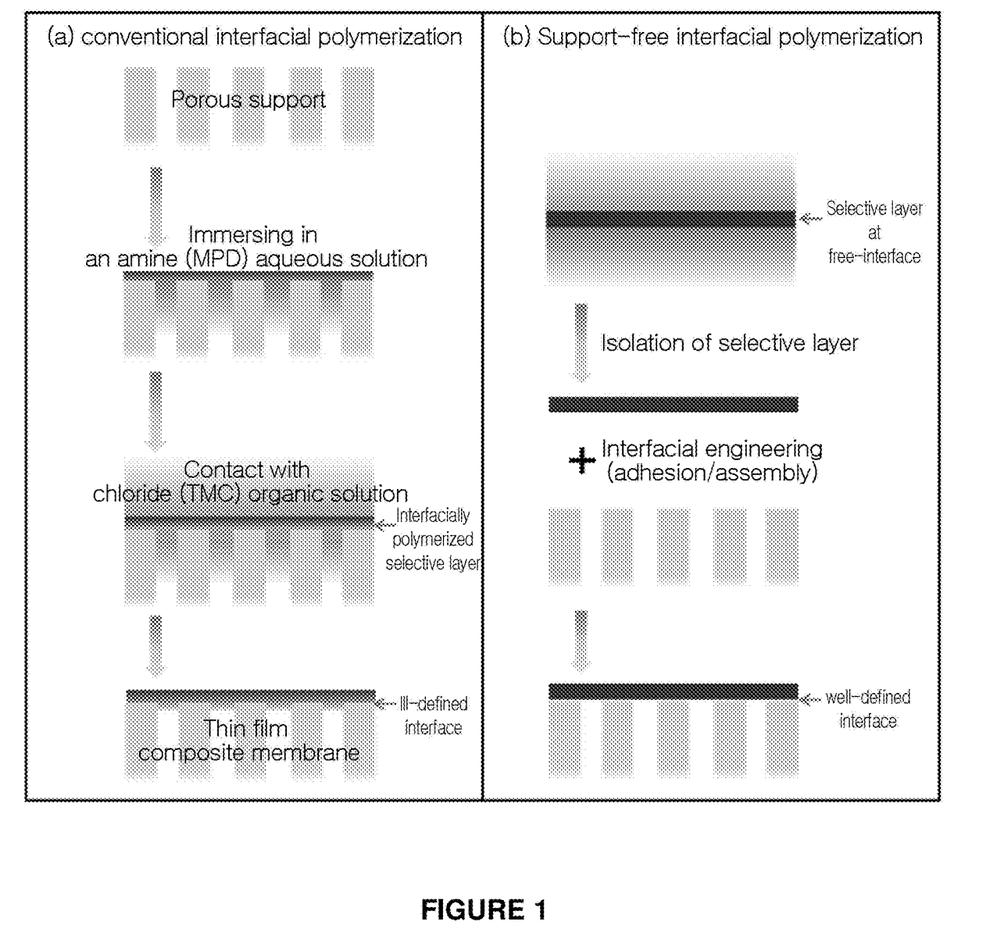
FIG. 1 illustrates the comparison of methods for manufacturing a membrane using interfacial polymerization at a free interface which does not have a support (support-free interfacial polymerization) and conventional interfacial polymerization.
Figure 2:
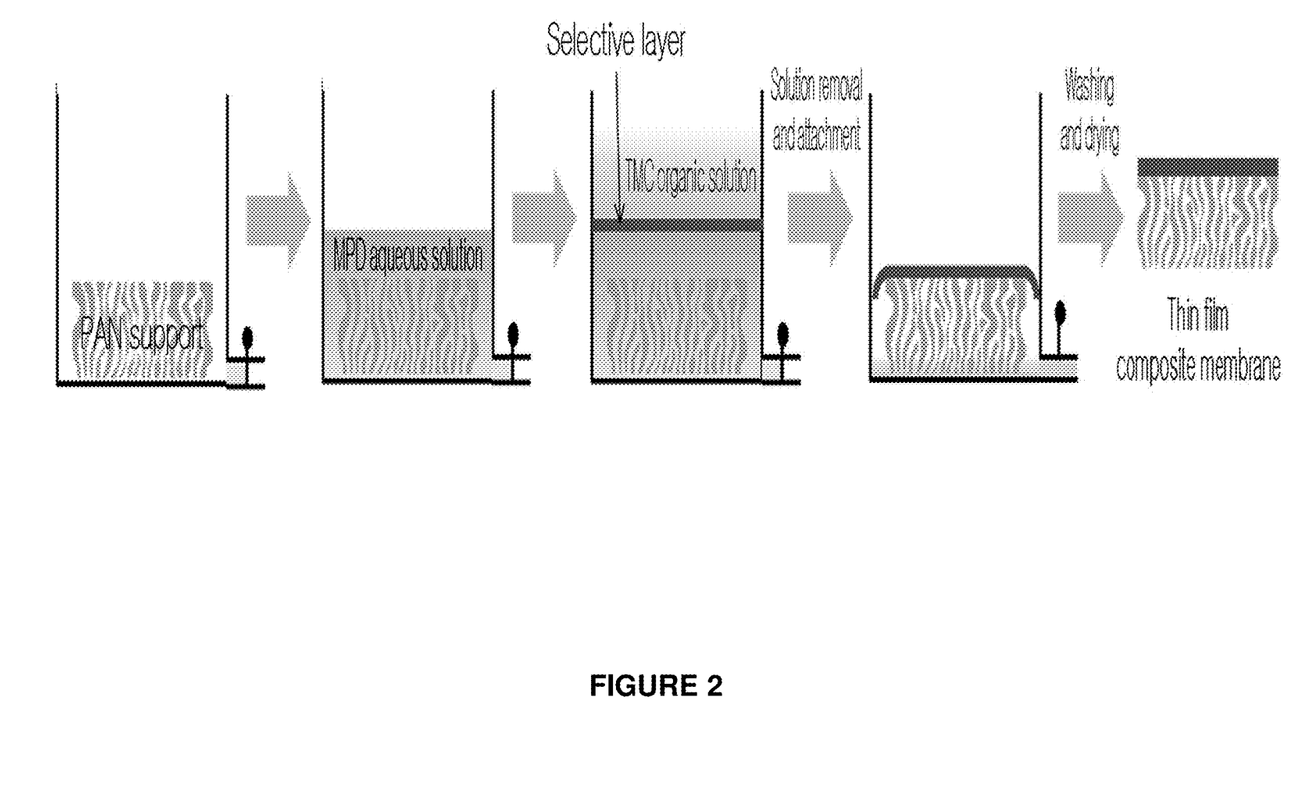
FIG. 2 illustrates a selective layer prepared through the support-free interfacial polymerization and a method for manufacturing a composite membrane using the same.
Figure 3:
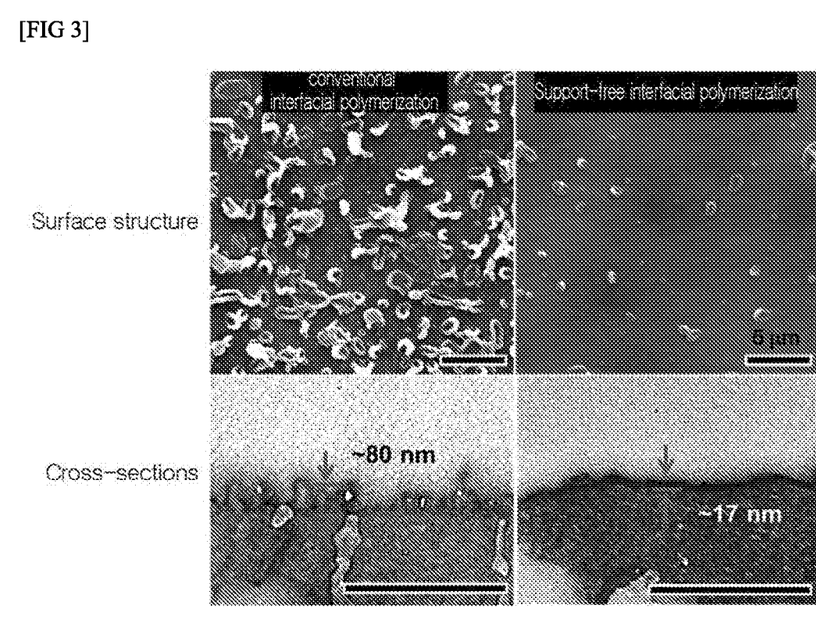
FIG. 3 illustrates the comparison of the surface and cross-sectional structures of selective layers of membranes manufactured by methods using the support-free interfacial polymerization and conventional interfacial polymerization.

As a result, as shown in FIG. 1 and FIG. 2, since the polymerization of a selective layer occurs at an interface without a support in the support-free interfacial polymerization according to the present invention compared to the conventional interfacial polymerization, a composite membrane was manufactured by synthesizing and adhering a selective layer that is not affected by the structural characteristics of a support. Meanwhile, in the case of the membrane manufactured according to the present invention, an interface between the support and the selective layer was well-defined unlike the conventional interfacial polymerization-based membrane. Also, as shown in FIG. 3, when the surface and cross-sectional structures of the selective layers of the membranes were compared, it was predicted that the selective layer prepared through the support-free interfacial polymerization is thinner and thus has excellent water flux performance, and also has a less uneven surface and thus has excellent contamination resistance compared to the conventional interfacial polymerization. In particular, since a membrane having a selective layer with a thickness of about 17 nm formed through the support-free interfacial polymerization is thinner than a selective layer with a thickness ranging from about 80 to 200 nm formed through the conventional interfacial polymerization, it is possible to manufacture a membrane having a precise form, thus further increasing the process improvement of a membrane.

Example 2: Verification of Performance of Manufactured Membrane

In order to verify the performance of the composite membrane manufactured using a PAN support by the method for Example 1, a 2000 ppm NaCl aqueous solution was permeated through the following (1) or (2) membrane under a high pressure (15.5 bar) condition to determine water flux and a salt rejection rate, by which membrane performance was compared.

A conventional interfacial polymerization-based membrane (manufactured by the methods disclosed in U.S. Pat. Nos. 4,277,344 and 5,614,099)

A support-free interfacial polymerization-based membrane (manufactured by the support-free interfacial polymerization according to the present invention)

As a result, as shown in Table 1, it was confirmed that the performance of the membrane significantly varies depending on the two manufacturing methods. That is, while the membrane manufactured through the conventional interfacial polymerization exhibited a salt (NaCl) rejection rate of about 96.7%, the membrane manufactured through the support-free interfacial polymerization exhibited an excellent salt rejection rate of about 99.0%, and thus can be applied to a reverse osmotic membrane. Also, while the membrane manufactured through the conventional interfacial polymerization exhibited a water flux of about 8.7 $Lm^{-2}h^{-1}$, the membrane manufactured through the support-free interfacial polymerization exhibited a water flux of about 13.3 $Lm^{-2}h^{-1}$, through which it can be seen that the membrane manufactured by the support-free interfacial polymerization exhibited higher water flux performance. That is, it can be seen that, although the same support and solution composition are used, the membrane manufactured through the support-free interfacial polymerization exhibits excellent salt rejection and water flux.

Table 1 illustrates the comparison of water flux and salt rejection performances of the conventional interfacial polymerization-based membrane and a support-free interfacial polymerization-based membrane.

TABLE 1

|  | Conventional interfacial polymerization-based membrane | Support-free interfacial polymerization-based membrane |
|---|---|---|
| Water flux ($Lm^{-2}h^{-1}$) | 8.7 ± 1.0 | 13.3 ± 0.8 |
| Salt (NaCl) rejection rate (%) | 96.7 ± 1.4 | 99.0 ± 0.3 |

INDUSTRIAL APPLICABILITY

The method for manufacturing a composite membrane having a selective layer prepared through the interfacial polymerization at a free interface which does not have a support (support-free interfacial polymerization) according to the present invention can contribute to the manufacture of a reverse osmosis membrane with high performance using various supports other than a conventional polysulfone support, and diversification of a support can extend the application range of a reverse osmosis membrane, which is limited due to low chemical resistance of polysulfone.

While specific portions of the contents of the present invention have been described in detail, it will be obvious to those skilled in the art that such detailed descriptions are only exemplary embodiments, and the scope of the present invention is not limited thereto. Therefore, the actual scope of the present invention will be defined by the appended claims and their equivalents.

The invention claimed is:

1. A method for manufacturing a composite membrane comprising the following steps:
   (a) fixing a porous support to a frame, putting the fixed support and frame into a container, and then adding a first solution, in which a first organic monomer is dissolved in a first solvent, such that the support is completely submerged;

(b) adding a second solution, in which a second organic monomer is dissolved in a second solvent, to the container to form an interface between the two solutions;

(c) inducing polymerization of the first organic monomer and the second organic monomer at the formed interface to form a selective layer; and (d) lowering the level of the first solution so that the selective layer coats the surface of the support, and adhering the selective layer to the support to obtain a composite membrane with an active layer adhered to the support.

2. The method according to claim 1, wherein the support is manufactured of a material selected from the group consisting of polysulfone (PSF), polyethersulfone (PES), polyacrylonitrile (PAN), polyimide, polyetherimide, polyether ether ketone (PEEK), polyethylene (PE), polypropylene (PP), polyvinylidene fluoride (PVDF), polyvinyl chloride, polytetrafluoroethylene (PTFE), polyvinylpyrrolidone (PVP), polycarbonate, cellulose acetate (CA), polybenzoimidazole (PBI) and a combination thereof.

3. The method according to claim 1, wherein the support is porous and has a pore size ranging from 1 nm to 1000 μm.

4. The method according to claim 1, wherein the first solvent is one or more solvents selected from the group consisting of water, methanol, ethanol, propanol, butanol, isopropanol, ethyl acetate, acetone and chloroform.

5. The method according to claim 1, wherein the first organic monomer is one or more organic monomers selected from the group consisting of m-phenylene diamine (MPD), o-phenylene diamine (OPD), p-phenylene diamine (PPD), piperazine, m-xylene diamine (MXDA), ethylenediamine, trimethylenediamine, hexamethylenediamine, diethylene triamine (DETA), triethylene tetramine (TETA), methane diamine (MDA), isophoronediamine (IPDA), triethanolamine, polyethyleneimine, methyl diethanolamine, hydroxyalkylamine, hydroquinone, resorcinol, catechol, ethylene glycol, glycerine, polyvinyl alcohol, 4,4'-biphenol, methylene diphenyl diisocyanate, m-phenylene diisocyanate, p-phenylene diisocyanate and toluene diisocyanate.

6. The method according to claim 1, wherein the second solvent is one or more solvents selected from the group consisting of hexane, pentane, cyclohexane, heptane, octane, carbon tetrachloride, benzene, xylene, toluene, chloroform, tetrahydrofuran and isoparaffin.

7. The method according to claim 1, wherein the second organic monomer is one or more monomers selected from the group consisting of trimesoyl chloride (TMC), terephthaloyl chloride, isophthaloyl chloride, cyclohexane-1,3,5-tricarbonyl chloride, 5-isocyanato-isophthaloyl chloride, cyanuric chloride, trimellitoyl chloride, phosphoryl chloride and glutaraldehyde.

8. The method according to claim 1, wherein the adhering of Step (d) is performed by treating a surface of the support by a process selected from the group consisting of chemical oxidation using an acidic or basic solution, plasma oxidation, UV oxidation, atomic layer deposition (ALD), chemical vapor deposition (CVD) and an inorganic or organic material coating.

9. The method of claim 1, wherein the first solvent and second solvent are immiscible with one another.

10. A composite membrane manufactured by the method according to claim 1, wherein a selective layer with a thickness ranging from 1 to 1000 nm, formed through interfacial polymerization at a free interface which does not have a support is adhered to a support.

* * * * *